D. H. BENJAMIN & J. G. ALBER.
LAUNDRY MACHINERY.
APPLICATION FILED MAY 22, 1914.

1,220,591.

Patented Mar. 27, 1917.
6 SHEETS—SHEET 1.

Witnesses:
A. L. Lord.
C. H. Tresch.

Inventors.
Dana H. Benjamin and
James G. Alber
by B. S. Brockett,
Atty.

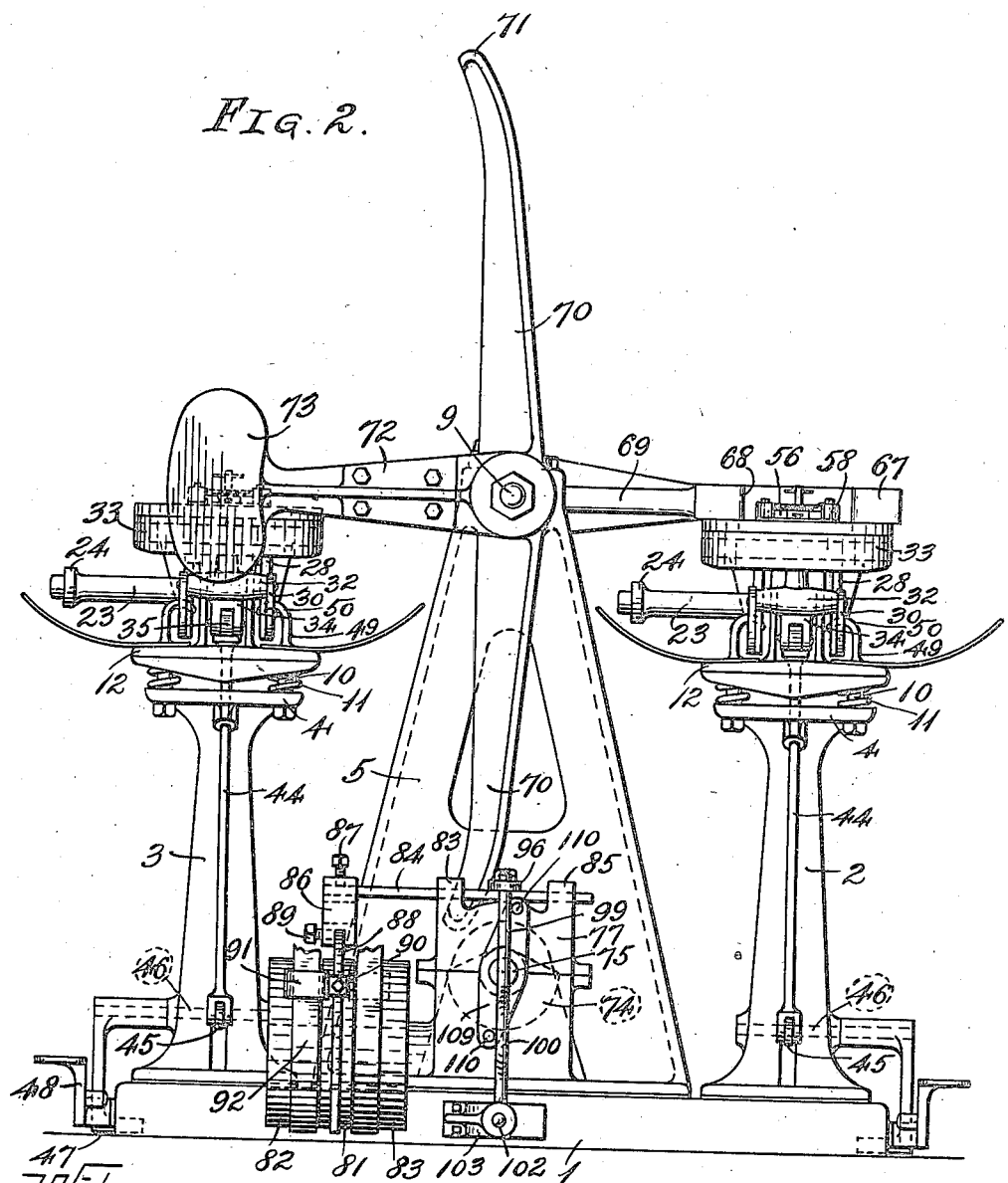

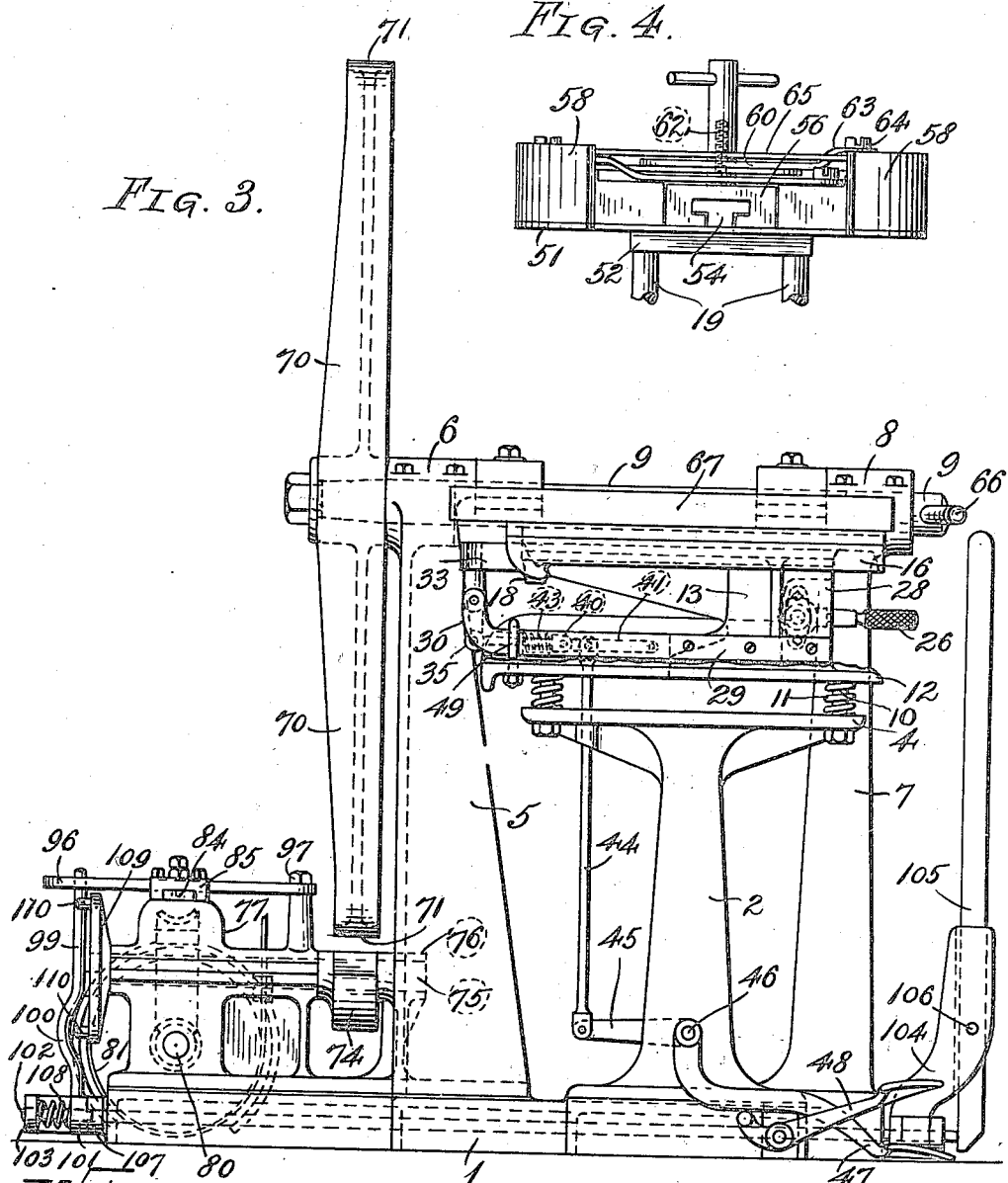

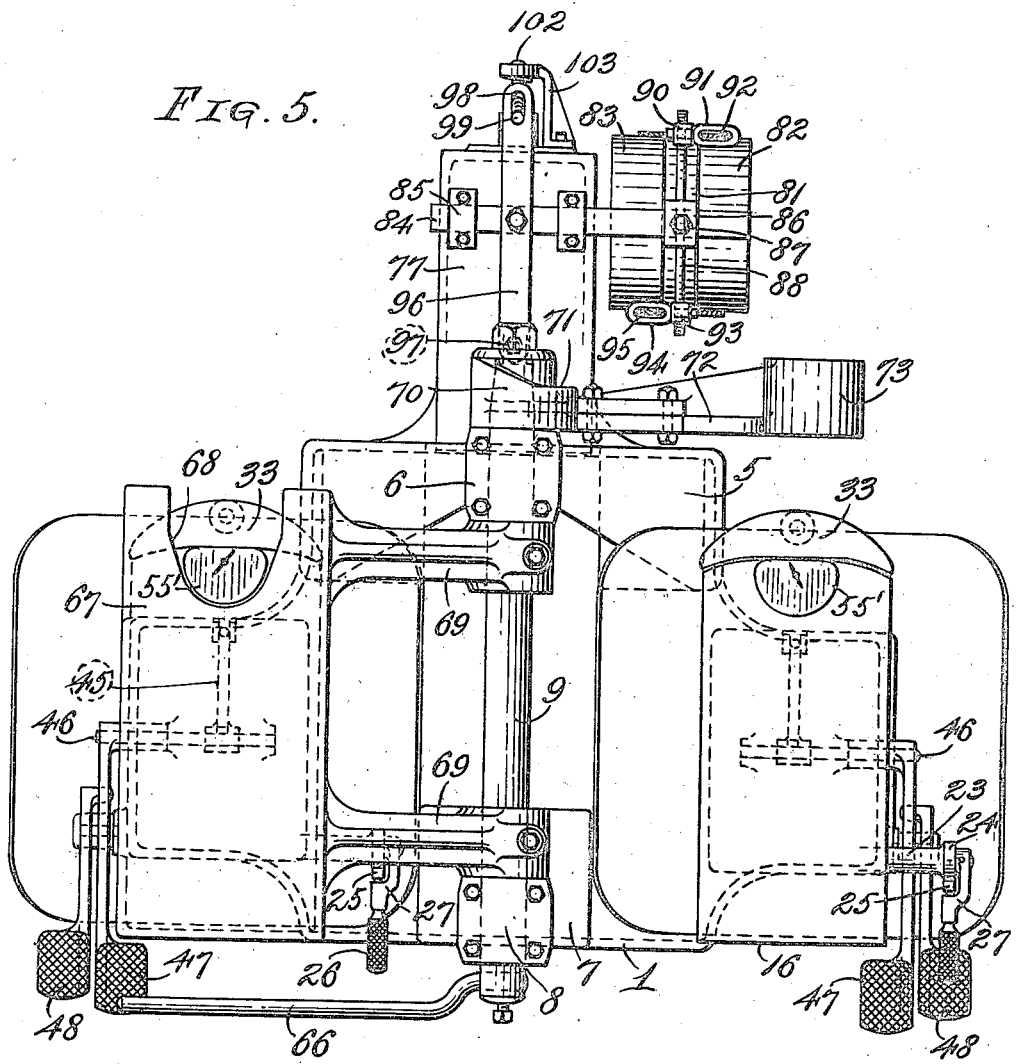

D. H. BENJAMIN & J. G. ALBER.
LAUNDRY MACHINERY.
APPLICATION FILED MAY 22, 1914.

1,220,591.

Patented Mar. 27, 1917.
6 SHEETS—SHEET 5.

Witnesses:
A. L. Lord.
C. M. Tresch.

Inventors.
Dana H. Benjamin and
James G. Alber,
by B. W. Brockett
Att'y.

D. H. BENJAMIN & J. G. ALBER.
LAUNDRY MACHINERY.
APPLICATION FILED MAY 22, 1914.
1,220,591.
Patented Mar. 27, 1917.
6 SHEETS—SHEET 6.
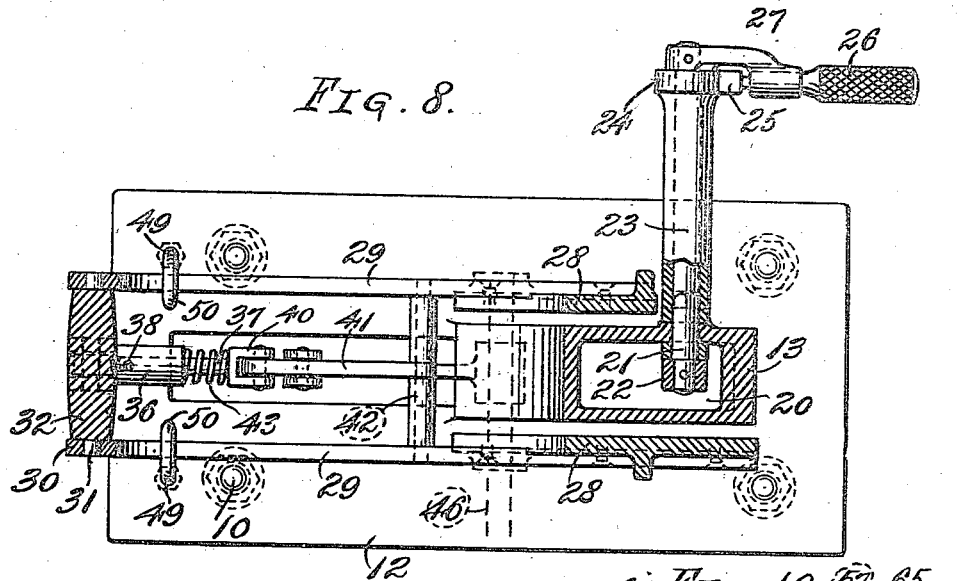
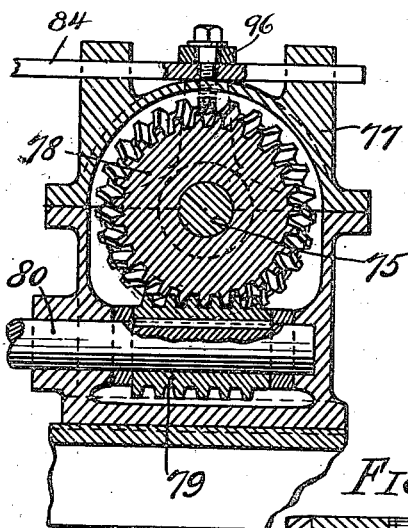
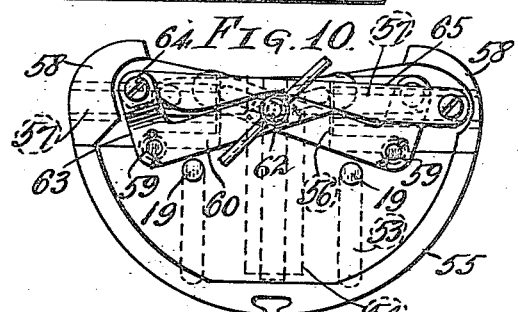
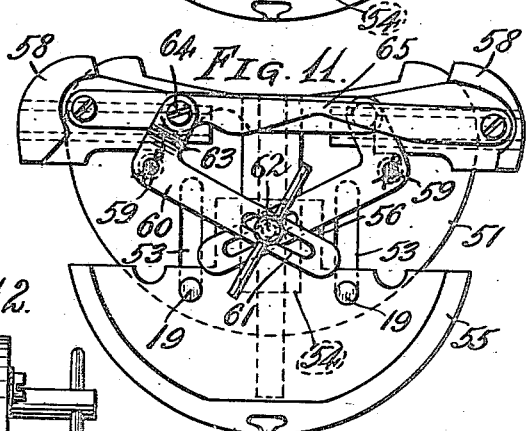

UNITED STATES PATENT OFFICE.

DANA H. BENJAMIN AND JAMES G. ALBER, OF CLEVELAND, OHIO, ASSIGNORS TO THE GUGGENHEIM LAUNDRY MACHINERY COMPANY, OF CLEVELAND, OHIO, A CORPORATION OF OHIO.

LAUNDRY MACHINERY.

1,220,591. Specification of Letters Patent. Patented Mar. 27, 1917.

Application filed May 22, 1914. Serial No. 840,192.

*To all whom it may concern:*

Be it known that we, DANA H. BENJAMIN and JAMES G. ALBER, citizens of the United States, residing at Cleveland, in the county of Cuyahoga and State of Ohio, have invented certain new and useful Improvements in Laundry Machinery, of which the following is a specification.

This invention relates to improvements in laundry machinery generally and particularly to bosom presses.

More specifically the invention relates to a bosom press comprising a frame, a pair of standards, a bosom board on each standard and arranged to equalize its position with the chest to insure equal pressure throughout the ironing surfaces, and a swinging double sided chest member adapted to alternately engage the bosom boards and to exert ironing pressure thereagainst, together with suitable mechanism for operating the several parts.

The invention may be further briefly summarized as consisting in the construction and combination of parts hereinafter set forth in the following description, drawings and claims.

Figure 1:
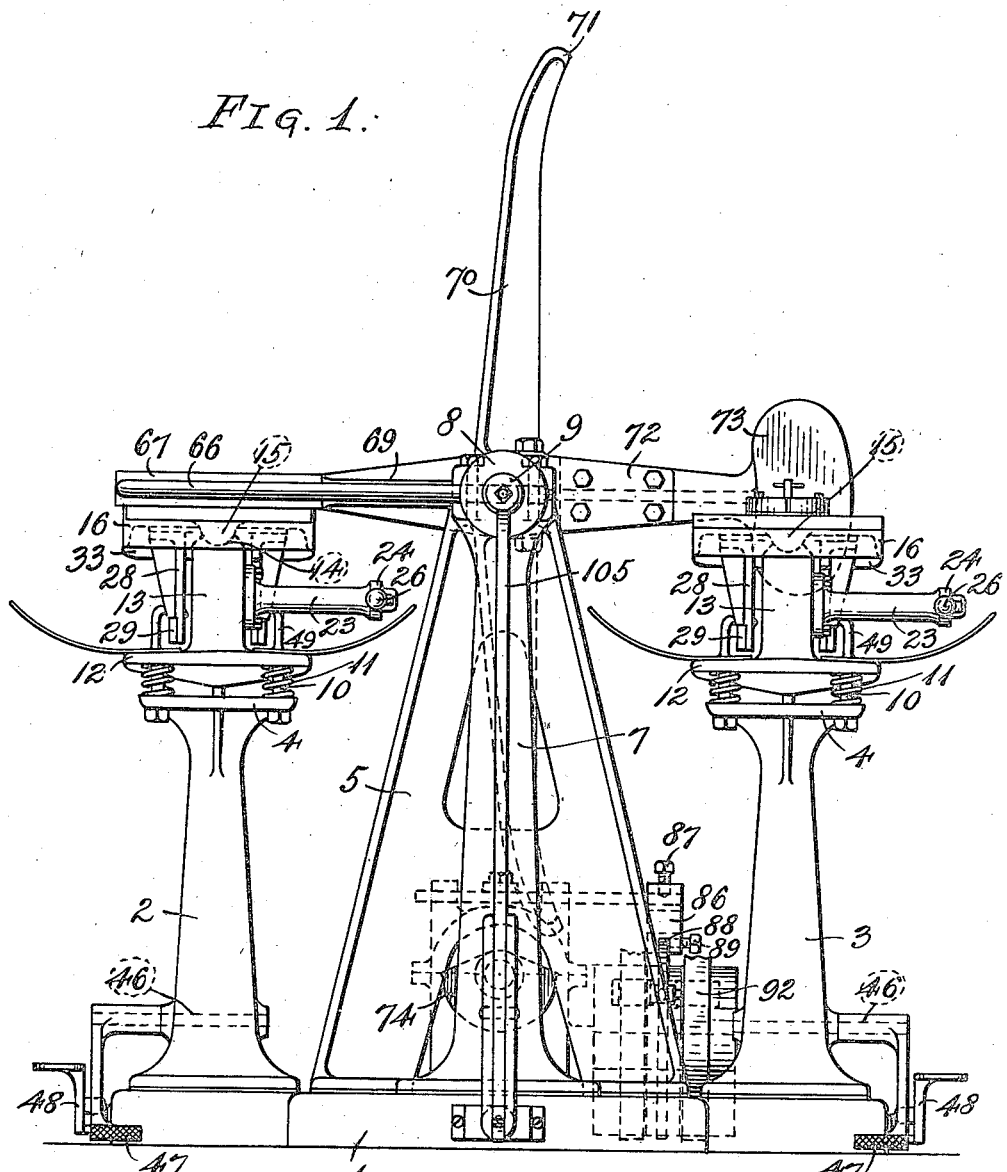
Figure 6:
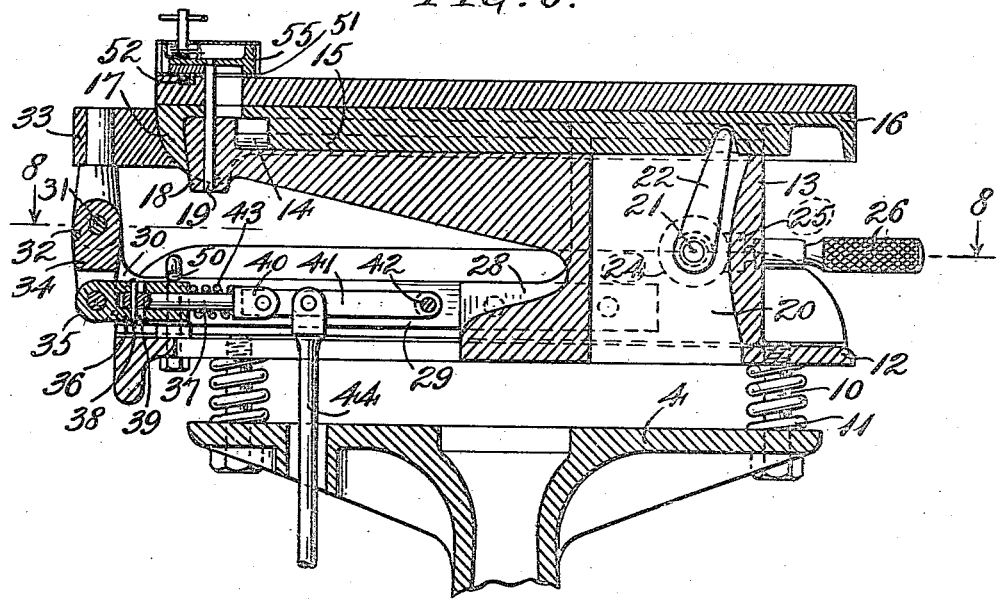
Figure 7:
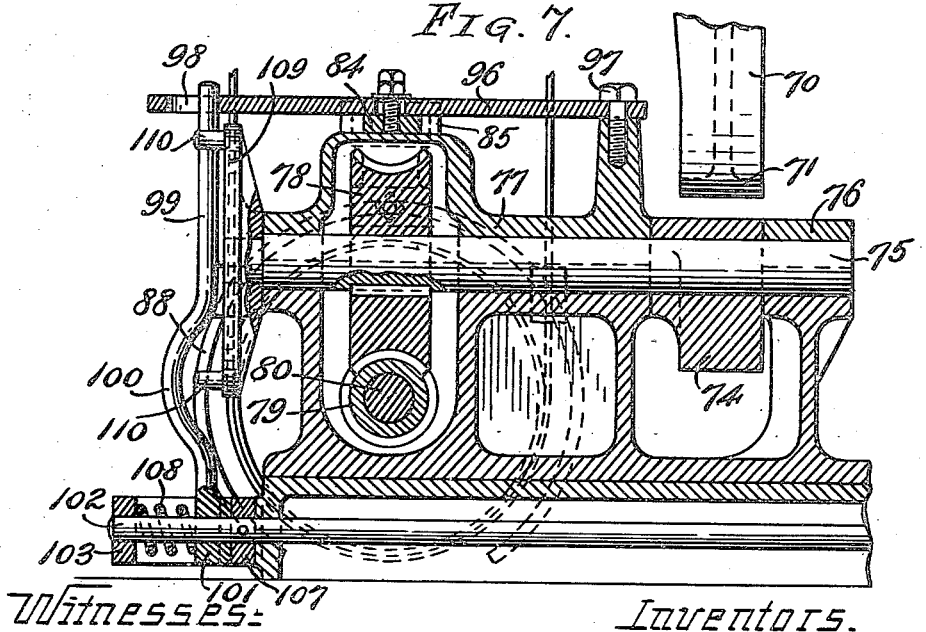

Referring to the drawings, Figure 1 is a front elevation; Fig. 2 is a rear elevation; Fig. 3 is a left-side elevation with respect to Fig. 1; Fig. 4 is a rear elevation of the neck band former; Fig. 5 is a top plan view of the machine; Fig. 6 is an enlarged sectional view of the ironing board and its mounting; Fig. 7 is a sectional view showing the gearing for the cam; Fig. 8 is a horizontal sectional view taken below the ironing board, on the line 8—8 of Fig. 6; Fig. 9 is a detail view partly in section; Fig. 10 is a top plan view of the neck band former; Fig. 11 is a similar view with the parts extended; and Fig. 12 is a side elevation of the neck band former.

In carrying out the invention any preferred form and construction of parts may be employed, so long as they possess the necessary characteristics, but we have shown one form in the drawings which is effective, and in such embodiment 1 represents a suitable base to which is secured a pair of ironing board standards 2 and 3 spaced apart, as shown. Each of these standards is provided with an upper flat platform 4 having openings therein for receiving bolts for securing the ironing board structure, to be later described, to the platform. Between the standards 2 and 3 and at the back of the bed 1 is an upright bearing support 5 carrying a bearing 6, and at the front another standard 7 provided with a bearing 8. These bearings support the chest operating shaft 9 which is used for a purpose to be later described. The shaft 9 and its bearings are arranged at the proper height above the table portions 4 of the standards 2 and 3 to allow for the ironing board structures.

The ironing board structures are identical, and there is one located in conjunction with each standard, and the description of one will suffice for both. Extending through the openings in the platform 4 are bolts 10 preferably four in number arranged near the four corners, and these bolts pass through coil springs 11 into an ironing board supporting plate 12 which is provided with an upwardly extending ironing board supporting portion 13, shown in end elevation in Fig. 1, and shown in dotted lines in Fig. 6. This portion has a horizontally extending ironing board supporting recess 14 along its upper edge, as shown in elevation in Fig. 1, and this recess is preferably half-round and receives a correspondingly-shaped rib 15 cast on the underside of the ironing board 16. The arrangement of these parts is such that the ironing board may rock freely in a transverse direction upon its support for insuring uniform engagement between the ironing surfaces. The ironing board 16 is provided at the neck band end with a yoke ironing portion 17 cut away in the back to receive a boss 18 formed at the extreme rear end of the ironing board support 13 and adapted to receive pins 19 which pass up into the neck band former. There is a pair of these pins and they are spaced apart, and the connection of the neck band former to them will be described later. The support 13 and its supporting plate portion 12 are preferably cast and form an integral structure, but the actual connecting portion itself is nearer to the front end of the board than the rear, so as to permit the rear portion of the shirt to be drawn down under the back of the board. The supporting portion 13 is provided with a chamber 20 open at the top and bottom and having passing transversely therethrough a shaft 21 provided with a lever 22, the upper end of which engages in a fan-shaped notch in the rib 15, so that upon the rocking of the shaft 21 the ironing board is moved longitudinally upon the support. This shaft 21 is mounted in suitable bearings in the sides of the support 13 and passes through a sleeve 23 secured to the side of the support and provided at the extreme outer end with a peripheral friction portion 24 adapted for engagement by a shoe 25 loosely mounted upon the end of a screw 26 threaded in a bracket 27 keyed to the end of the shaft 21, the arrangement being such that when the screw is moved in one direction, the shoe is released from its engagement with the peripheral portion 24 when it may be moved about its center and the position of the ironing board may be adjusted, and when adjusted be held in such adjustment by tightening the screw. This same movement adjusts the neck band former, as will later appear.

Secured to the underside of the ironing board 16 and arranged one on each side of the support 13 is a pair of brackets 28 of substantially the form shown, and each carrying a rail 29. Each of the rails 29 is provided with an upturned end portion 30 and these end portions receive a pin or shaft 31 upon which is swiveled the hub 32 of the yoke clamping member 33. This yoke clamping member has a downwardly extending arm 34, shown in Fig. 6, and pivotally connected to an ear 35 carried by a hollow socket member 36 which receives a rod 37 limited in its movement with respect to the socket by a transverse pin 38 passing into diametrically opposed slots 39 in the socket member. The outer end of this rod is provided with an eye 40 pivoted to a toggle link 41 in turn connected upon a shaft or pin 42 extending across between the rails 29, as shown in Fig. 8. A spring 43 is arranged between the socket member 36 and the eye 40. Pivotally connected to the link 41 is an operating rod 44 connected to an operating arm 45 keyed to a shaft 46 passing through the corresponding ironing board standard and on the outer end provided with an operating treadle 47. Coöperating with this treadle 47 is a trip treadle 48 adapted to trip the same.

It will be seen from the foregoing description that when the parts are in the position shown in the drawings and when the clamp is in engagement with the yoke ironing portion, that the clamp may be released by pressing upon the trip lever 48 which will cause the shaft 46 to move in a clockwise direction and break the toggle formed by the link 41 and rod 43 and its socket, thus releasing the clamp, these parts being again set by pressing upon the treadle 47.

In order to limit the transverse rocking movement of the ironing board upon its support, and also to prevent it, together with the connected parts, from being easily displaced, suitable pins 49 extend up from the supporting plate portion 12 and each having an end hook 50 passing over the rails 29. The hooked portions do not touch the rails, but merely limit the upward movement.

Any suitable neck band structure may be utilized with the press. It must be of a type, however, which will coöperate with the movement of the board to adjust the neck band former to the proper size of neck band, and in the embodiment shown, the neck band former comprises a main supporting plate 51 having upon the bottom thereof a transverse block 52 fitting into a suitable opening in the ironing board 16 and holding the plate so as to move with the ironing board. This plate is also provided with a pair of slots 53, one on each side of the center and adapted to receive the pins 19 secured in the bosom board support 13. These pins are shown in side elevation in Fig. 6. The plate 51 is also provided upon its upper surface, as shown in Fig. 4, with a T-shaped guiding block 54 adapted to fit into and guide a forward main curved body portion 55 of the neck band former, so that this main body portion may slide freely upon the plate 51 and be held in a definite relation thereto. This main body portion is provided with a rearward extension 56 which extends between the foot portions to be described to the back edge of the plate 51, as is shown in Fig. 10. Secured to the plate 51 and arranged transversely of the guide 54 is a pair of T-shaped guiding blocks 57 one arranged on each side of the center and each engaging in a suitable opening in a rear foot or corner portion 58, which when in its innermost position, conforms to the corresponding rear outer corner of the plate 51. These foot or corner portions also form a continuation of the main body portion of the neck band former.

In order to cause these foot portions to move in and out transversely with the forward and backward movement of the main body portion 56 suitable connecting lever and link mechanism is provided, and it consists of a pair of fixed pins 59 secured in the plate 51 and arranged one on each side of the center and near the foot portions, as shown in Fig. 11. Mounted upon each of these pins 59 is a flat bell crank lever comprising a relatively long arm 60 provided with a slot 61 engaging the shank of a clamping screw 62 threaded into the extension 56 of the main body portion of the neck band former, and having a short arm 63 engaging a pin or screw 64 mounted in a link 65 pivotally connected to the opposing foot portion 58. In like manner the other pivot pin supports a bell crank lever connected to the opposing foot portion. By this arrangement it will be seen that when the bosom board is moved the main body portion 56 of the neck band former will be held stationary since the pins 19 are mounted in this portion and in the bosom board support 13, while the plate 51 will be moved backward with the bosom board. This backward movement, however, through the lever and link mechanism in the neck band former causes the foot portions to move outward as the parts move back, with the result that the neck band former is adjusted to the neck band of the shirt. The bosom board is then locked in position.

The description thus far has been confined to the bosom board and its mounting and the neck band former and its arrangement, and the description will now be given of the ironing chest structure and its operating mechanism.

Secured on the forward end of the shaft 9 is an operating lever 66 by which the shaft 9 may be rocked by hand for swinging the ironing chest 67. The ironing chest 67 has an ironing face on each side, and a neck band recess 68 extending entirely through the chest, and it is heated by steam or in any suitable manner, not shown, and is supported upon the shaft 9 by suitable arms 69 keyed thereto. The chest is thrown from one bosom board to the other by means of the lever 66 but in order to give the final ironing pressure the shaft is provided with substantially diametrically opposed pressure arms 70 which are arranged at substantially an angle of ninety degrees to the chest and are provided with curved end portions 71 which engage with the operating cam to be described. Diametrically opposed to the chest and forming a part of the casting comprising the two pressure arms 70 is a counterbalance weight shank 72 to which is secured a counterbalance weight 73 adapted to counterbalance the weight of the parts and permit them to be swung readily by hand.

In order to transmit the final pressure to the chest one or the other of the arms 70 is engaged and the mechanism for accomplishing this result comprises a cam 74 mounted upon a shaft 75 supported in a bearing 76 and in a gear casing 77. This shaft 75 extends into the casing and is there provided with a worm wheel 78 meshing with a worm 79 mounted upon a transverse shaft 80 extending outside of the casing, as shown in Fig. 2, and there provided with a centrally located fast pulley 81 and two idle pulleys 82 and 83, one arranged on each side of the fast pulley 81. These two idle pulleys 82 and 83 are driven in opposite directions by belts or in any suitable manner from any source of power.

In order to control all the belts suitable belt shifting mechanism is provided, and it consists of a transversely movable bar 84 supported in suitable guides 85 carried by the casing 77. The outer end of this bar is provided with a block 86 held in any adjusted position upon the bar by a suitable set screw 87. The lower portion of this bar carries a belt shipper bar 88 square in cross section and held in the block by means of a set screw 89. This bar on one side of the block 86 is provided with a loop block 90 provided with a belt loop 91 adapted to pass around the belt 92. On the opposite side of the block this bar 88 is provided with a belt loop block 93 carrying a belt loop 94 receiving a belt 95. The blocks 90 and 93 are held in place by suitable set screws.

The mechanism for shifting the transversely movable bar 84 comprises a lever 96 pivoted at one end to the bolt 97 and at the opposite end provided with a slot 98 receiving the upper end of a shifting rod 99. This rod is provided with an outwardly curved portion 100, as shown in Fig. 3 particularly, for a purpose to be described, and below this is provided with a coupling collar 101 mounted upon a rocker shaft 102 supported in an end bracket 103 secured to the base 1. The rocker shaft 102 extends through to the front of the machine, as shown in Fig. 3, and is there provided with a rocker arm 104 having a hand lever 105 pivoted upon a pin 106 in the arm with the lower end thereof in a position to engage the end of the shaft 102. Adjacent to the coupling collar 101 of the shifting rod 99 is a coupling collar 107 keyed to the rocker shaft 102. The coupling collar 101 is forced into engagement with the coupling collar 107 by means of a spring 108. It will be seen from this construction that as the rocker arm 104 is moved from side to side by the hand lever 105, the shifting rod 100 will be rocked in like manner and will move the lever 96 so as to shift the belts 92 and 95 into and out of engagement with the fast pulley.

In order to render the device automatic, however, that is, in order to shift either belt back to its idle running position after the cam 74 has been moved into engagement with one or the other of the arms 70 and also in order to throw the belts back into the idle position after this cam has been moved from this position, the shaft 75 is provided with a member having a pair of diametrically opposed arms 109 each provided with a pin 110, as shown in the various figures and set forth particularly in Figs. 2 and 3, and the operation is as follows:—

Assuming that the parts are in the position shown in Fig. 2 and that pressure is to be applied, the cam 74, which is shown in dotted lines in this figure, must rotate in a counterclockwise direction, and the belt 92 must be moved onto the fast pulley 81 in order to transmit this direction of rotation to the cam, but the operator cannot shift the lever toward the board which is being engaged by the chest at this particular time until the shifting rod 100 is moved past the pin 110, and to accomplish this the hand lever 105 is pulled outward causing the rocker shaft 102 to shift the collars 107 and 101 and the shifting rod rearward, as shown in Fig. 3, with the result that the shifting rod 100 is moved out beyond the pin 110, when the operator may shift the shaft 102 in a clockwise direction and past the pin. This then causes the belt 92 to engage the fast pulley, with the result that the cam is rotated from the position shown in dotted lines in this figure to the position where it engages one of the arms 70. Pressure is then being applied upon the board. In the meantime, however, the operator has released the hand lever 105 and the shifting rod 100 has moved forward. It, however, is still in the position in which it was moved but it is also in the path of the other pin 110 which returns the shifting rod to normal position, as shown in Fig. 2. In order to release the pressure the operator must go through the same operation and bring the belt 92 into engagement with the fast pulley. In order to create pressure in a similar manner upon the other board after the chest has been swung into position, the operator moves the hand lever 105 in the other direction, causing the belt 95 to be brought into engagement with the fast pulley for the pressure and the releasing operation.

Having described our invention, we claim:—

1. In an ironing press, a pair of ironing boards mounted in a relatively fixed position, a movable ironing chest coöperating with both boards, means for equalizing the position of each board with respect to the chest whereby their meeting surfaces will contact uniformly throughout, means for moving the chest, and means for exerting an ironing pressure between the chest and each board.

2. In an ironing press, an ironing chest movably mounted, a pair of ironing board structures each comprising a standard, an ironing board, a longitudinally disposed curved ridge carried by one part and receiving a curved recessed member carried by the other part whereby the board may swing transversely to equalize itself to the chest, means for moving said chest, and means for exerting a pressure between each board and the chest.

3. In an ironing press, an ironing board structure comprising an ironing board supporting member, a board slidably mounted upon said member, a neck band former comprising a main body portion fixed with respect to the support, and rear corner portions movable with the board, an ironing chest movable upon an axis in parallel alinement with the longitudinal axis of the board and having a neck band recess for receiving the neck band former, means for moving said chest, and means for exerting a pressure between the chest and the board.

4. In an ironing press, a frame, a pair of ironing boards supported thereby, a shaft mounted between and in parallel alinement with said board, an ironing chest mounted upon said shaft, suitable lever arms operatively connected to said chest to force the same in contact with the board, and means for engaging said arms to bring about said pressure.

5. In an ironing press, a frame, a pair of ironing boards supported thereby, a shaft mounted between and in parallel alinement with said board, an ironing chest mounted upon said shaft, a pair of diametrically opposed lever arms substantially ninety degrees with respect to the chest, and means for engaging one or the other of said arms and creating pressure between the chest and the board with which it is in engagement.

6. In an ironing press, a frame, a pair of ironing boards supported thereby, a shaft mounted between and in parallel alinement with said board, an ironing chest mounted upon said shaft, a pair of diametrically opposed lever arms substantially ninety degrees with respect to the chest, and a cam for engaging one or the other of said arms and creating a pressure between the chest and the board with which it is in engagement.

7. In an ironing press, a frame, a pair of ironing boards supported thereby, a shaft mounted between and in parallel alinement with said board, an ironing chest mounted upon said shaft, a pair of diametrically opposed lever arms substantially ninety degrees with respect to the chest, a cam for engaging either of said arms and creating a pressure between the chest and the board with which it is in engagement, and suitable gearing for operating said cam.

8. In an ironing press, a frame, a pair of ironing boards supported thereby, a shaft mounted between and in parallel alinement with said board, an ironing chest mounted upon said shaft, a pair of diametrically opposed lever arms substantially ninety degrees with respect to the chest, a cam for engaging either of said arms and creating a pressure between the chest and the board with which it is in engagement, and suitable gearing for operating said cam, said gearing comprising means for driving the cam in both directions, and means actuated manually for controlling the direction of said means.

9. In an ironing press, a frame, a pair of ironing boards supported thereby, a shaft mounted between and in parallel alinement with said boards, an ironing chest mounted upon said shaft, a pair of diametrically opposed lever arms substantially ninety degrees with respect to the chest, a cam for engaging either of said arms and creating a pressure between the chest and the board with which it is in engagement, suitable gearing for rotating said cam in either direction, manually operated controlling means for conveying the proper direction of rotation to the cam, and means for automatically releasing the same.

10. In an ironing press, a frame, a pair of ironing boards supported thereby, a shaft mounted between and in parallel alinement with said boards, an ironing chest mounted upon said shaft, a pair of diametrically opposed lever arms substantially ninety degrees with respect to the chest, a cam for engaging either of said arms and creating a pressure between the chest and the board with which it is in engagement, suitable gearing for rotating said cam in either direction, manually operable means having two directions of operation, one toward each board, means whereby one of the two operations toward each board will cause the cam to be operated in a direction to create pressure and the second operation toward the same board will cause the gearing to release said pressure, and means for driving said gearing.

11. In a laundry machine, a pair of ironing boards mounted in spaced relation to each other, and a heated member having two ironing surfaces and movable in one direction to bring one of its surfaces into coöperative relation with one of said boards and in another direction to bring its other surface into coöperative relation with the other board.

12. In a laundry machine, a pair of ironing boards mounted in spaced relation to each other, and a single heated ironing chest having two ironing surfaces, said chest being movable in one direction to bring one of its surfaces into coöperative relation with one of said boards and in the other direction to bring its other surface into coöperative relation with the other board.

13. In a laundry machine, a pair of ironing boards mounted in spaced relation to each other, and a swinging arm mounted to turn relatively to said boards and carrying a heated ironing chest provided with opposite ironing surfaces, said arm when moved in one direction being adapted to bring one of said ironing surfaces into coöperative relation with one of said boards and when moved in the other direction to bring the other ironing surface into coöperative relation with the other board.

In testimony whereof we affix our signatures in presence of two witnesses as follows.

DANA H. BENJAMIN.
JAMES G. ALBER.

Witnesses:
G. O. FARQUHARSON,
C. H. TRESCH.